United States Patent [19]

Nishida et al.

[11] Patent Number: 5,785,892
[45] Date of Patent: Jul. 28, 1998

[54] ORGANO-ANTIMONY OXIDE SOLS AND COATING COMPOSITIONS THEREOF

[75] Inventors: Hiroyasu Nishida; Yoshichika Tanaka; Michio Komatsu, all of Kitakyushu; Teruo Migita, Kitakyuhu, all of Japan

[73] Assignee: Catalysts & Chemicals Industries Co., Ltd., Tokyo, Japan

[21] Appl. No.: 137,140

[22] PCT Filed: Apr. 24, 1992

[86] PCT No.: PCT/JP92/00536

§ 371 Date: Mar. 22, 1994

§ 102(e) Date: Mar. 22, 1994

[87] PCT Pub. No.: WO92/19540

PCT Pub. Date: Nov. 12, 1992

[30] Foreign Application Priority Data

Apr. 24, 1991 [JP] Japan .................. 3-122303

[51] Int. Cl.$^6$ .................. B01D 13/00; C08K 3/20
[52] U.S. Cl. .................. 252/309; 522/81; 523/203; 524/409; 428/405
[58] Field of Search .................. 252/309, 313.1; 556/5, 2, 10; 522/81; 523/203; 524/409; 428/405

[56] References Cited

U.S. PATENT DOCUMENTS

| | | | |
|---|---|---|---|
| 4,100,075 | 7/1978 | Ashman et al. | 252/611 |
| 4,374,158 | 2/1983 | Taniguchi et al. | 427/41 |
| 4,659,847 | 4/1987 | Kobashi et al. | 556/5 |
| 4,731,198 | 3/1988 | Watanabe et al. | 252/313.1 |
| 4,770,813 | 9/1988 | Watanabe et al. | 252/309 |
| 4,772,660 | 9/1988 | Kitamura et al. | 524/786 |
| 5,008,172 | 4/1991 | Rokutanzono et al. | 430/67 |
| 5,116,644 | 5/1992 | Asai et al. | 427/164 |
| 5,181,142 | 1/1993 | Asai et al. | 359/581 |

FOREIGN PATENT DOCUMENTS 0197503  10/1988  European Pat. Off. .

62-129140  6/1978  Japan .
61-227919  10/1986  Japan .
1-131028  5/1989  Japan .

OTHER PUBLICATIONS

Derwent Abstract, AN-87-117708/17 (corresponding to J62-95130-A and US 4,722,660) (1987).
Derwent Abstract, AN-85-304396/49 (corresponding to J60-251129-A) (1985).
Derwent Abstract, AN-85-298360/48 (corresponding to J60-251129-A and US 4,659,847) (1985).
Derwent Abstract, AN-88-358308/50 (corresponding to J63-270197-A) (1988).
Derwent Abstract, AN-87-003784/01 (corresponding to J61-264042-A) (1987).
Derwent Abstract, AN-85-150682/25 (corresponding to J60-084337-A) (1985).
Derwent Abstract, AN-83-57633K/24 (corresponding to J58-076443-A) (1983).

*Primary Examiner*—Richard D. Lovering
*Assistant Examiner*—Daniel S. Metzmaier
*Attorney, Agent, or Firm*—Panitch, Schwarze, Jacobs & Nadel, P.C.

[57] ABSTRACT

An organo-antimony oxide sol capable of affording an electrical conductivity property and a photo-setting coating composition containing such a sol are provided. The particulate colloidal antimony oxide, i.e. a dispersoid in the sol, has a pyrochlore structure and is surface-treated with an organo-silicon compound of the formula

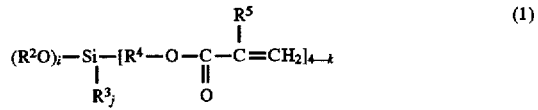

(1)

wherein $R^2$ is hydrogen or a $C_1$–$C_5$ alkyl group; $R^3$ is hydrogen or a $C_1$–$C_5$ alkyl group; $R^4$ is a $C_1$–$C_8$ alkylene group; $R^5$ is hydrogen or a $C_1$–$C_8$ alkyl group; i is an integer of 1–3; j is an integer of 0–2; and k is an integer of 1–3 equal to i+j.

27 Claims, No Drawings

5,785,892

ORGANO-ANTIMONY OXIDE SOLS AND COATING COMPOSITIONS THEREOF

This application is filed under 35 U.S.C. 371 of PCT/JP92/00536, filed Apr. 24, 1992.

BACKGROUND OF THE INVENTION

1. Field of the Invention

This invention relates to an organo-antimony oxide sol and a coating composition containing such a sol.

2. Prior Art

Antimony oxide particles are known to be flame-retarding, and antimony oxides having a pyrochlore structure are electrically conductive as reported for example in the Japan Chemical Journal, Vol. 4 (1983), page 488.

As a result of its high flame-retarding properties, the particulate antimony oxide has heretofore found extensive application as a useful ingredient for a coating applied to fabrics, plastics and the like. The antimony oxide should be after preferably in the form of a colloidal solution or sol for the preparation of either flame-retarding or electrically conductive coating formulations.

Amongst a number of prior art documents concerning antimony oxide sols, there may be cited Japanese Laid-Open Patent Publication No. 60-251129 in which a colloidal antimony oxide sol, a dispersoid, containing 0.5–25 percent by weight of antimony oxide and having a pH of the order of 2.5–12 is surface-reformed by an organo-silicon compound of the formula

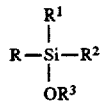

wherein R is and $C_{1-8}$ substituent containing no amino group, mercapto group, methacryloxy group or halogen atom; $R^1$ and $R^2$ are each $C_1$–$C_4$ hydrocarbon groups; and $R^3$ is a $C_1$–$C_4$ alkyl, alkoxy-substituted alkyl or acetyl group. Such antimony oxide hydrosol is well compatible with alcohol, ketone and other usual organic solvents. It is also compatible with normally liquid organic compounds such as for example vinyl monomers or oligomers for photo-setting resins (hereinafter referred to as photo-setting monomer or oligomer), provided that the antimony oxide dispersoid is surface-reformed by the use of relatively large quantities of the above organo-silicon compound. In the absence of insufficient organo-silicon compound, the antimony oxide sol would tend to undergo gellation upon blending with the vinyl monomer or oligomer. Attempts to use increased proportions of the organo-silicon compound for surface-reforming the dispersoid would result in loss of electric conductivity intrinsic of the antimony oxide.

Japanese Laid-Open Patent Publication No. 62-95130 discloses the use of a dispersant predominant of more than 80 mol % of monomers susceptible to hardening upon exposure to ultraviolet rays, electron rays, γ-rays, X-rays and like optical energies, and the use of a dispersoid which is an organosol of silica, alumina or iron oxide, but fails to teach or suggest the use of an organosol of antimony oxide as the dispersoid.

As a matter of fact, the method taught by this prior art publication is infeasible for the production of an organosol comprising a photo-setting monomer dispersant and an antimony oxide dispersoid as contemplated by the present invention. The prior art method of Laid-Open '130 may be summarized to comprise admixing a starting material of silica or alumina hydrosol or alcohol with a photo-setting monomer and stripping off the water or alcohol in vacuum thereby replacing the sol dispersant with the photo-setting monomer.

Therefore, it is necessary to provide an organosol with an dispersant for a starting antimony oxide hydrosol or alcohol. To the best knowledge of the inventors, however, there has been introduced no such an organosol of antimony oxide which is homogeneously miscible with a photo-setting monomer. The only antimony oxide hydrosol miscible with the photo-setting monomer is one which may be available upon surface-reforming the antimony oxide with such large quantities of an organo-silicon compound that would sacrifice the electrically conductive properties of the antimony oxide per se.

DETAILED DESCRIPTION OF THE INVENTION

It is a primary object of the present invention to provide an organo-antimony oxide sol in which the antimony oxide is dispersed in an organic solvent highly compatible with a photo-setting monomer or oligomer without imposing an adverse effect upon the electrically conductive properties of the antimony oxide.

It is another object of the invention to provide an organo-antimony oxide sol comprising a dispersoid which is an electrically conductive colloidal antimony oxide dispersed in a dispersant, a majority of which is a photo-setting monomer or oligomer.

It is a further object of the invention to provide a coating composition containing the above-mentioned organo-antimony oxide sol.

It is still another object of the invention to provide a plastics molded article coated with a film of the aforesaid coating composition.

The colloidal antimony oxide having a pyrochlore structure used in particulate form according to the invention is treated with an organo-silicon compound of the formula

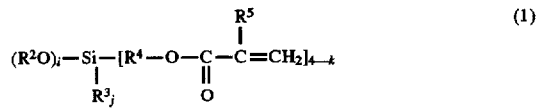

wherein $R^2$ is hydrogen or a $C_1$–$C_5$ alkyl group; $R^3$ is hydrogen or a $C_1$–$C_5$ alkyl group; $R^4$ is a $C_1$–$C_8$ alkylene group; $R^5$ is hydrogen or a $C_1$–$C_8$ alkyl group; i is an integer of 1–3; j is an integer of 0–2; and k is an integer of 1–3 equal to i+j.

Exemplary of the dispersant employed in the invention are alcohol, ketone, aliphatic hydrocarbon, alicyclic hydrocarbon, aromatic hydrocarbon and other organic solvents. However, these solvents are preferably photo-setting monomers.

The antimony oxide may not necessarily be pure as long as it has a pyrochlore structure and may therefore be doped with silicon, zinc, tin, indium, phosphorus, boron, titanium, zirconium, hafnium, cerium, iron, tellurium, tungsten and other different elements to produce complex antimony oxide particles.

The organo-antimony oxide sol according to the invention may be prepared as follows;

(i) Preparation of hydrosol of antimony oxide

An antimony trioxide and an alkaline material are admixed in a molar ratio of 1:2.0–2.5 and dispersed in water to prepare an alkaline suspension. The concentration of the antimony trioxide in the suspension is preferably in the range of 3-15% by weight. The suspension is heated to above 50° C., followed by addition in droplets of a hydrogen peroxide (concentrated at 5-35% by weight) at a rate of 0.2 mol/hr. or less per mol antimony trioxide. The resulting reaction product is passed through a cationic exchange resin to remove the alkali ions and heated to sol, followed by ultrafiltration to obtain an antimony oxide hydrosol (5-40 wt. % by concentration).

(ii) Pretreatment of particulate colloidal antimony oxide.

The antimony oxide hydrosol is admixed with an organo-silicon compound of Formula (2) shown below and an organic solvent, typically a lower alcohol, and heated with stirring to 30-70 C.° for 0.5-5 hours until the hydrosol is fully treated.

$$R_n\text{—Si—}(OR^1)_m \quad (2)$$

wherein R is a $C_1$–$C_6$ hydrocarbon group; $R^1$ is a $C_1$–$C_6$ alkyl group; n is an integer of 0–3; and m is an integer of 4–n.

Examples of the $C_1$–$C_6$ hydrocarbon group include alkyl, vinyl, allyl and acetyl groups.

The organo-silicon compound of Formula (2) includes alkoxysilanes such as tetramethoxysilane, methyltrimethoxysilane, dimethyldimethoxysilane, trimethylmethoxysilane, tetraethoxysilane, methyltributoxysilane, methyltriisopropoxysilane and phenyltriethoxysilane; vinylsilanes including vinylalkoxysilanes such as vinyltriethoxysilane.

The organo-silicon compound of Formula (2) is added for the purpose of the invention in an amount on the basis of $SiO_2$ of 0.01-0.8 mol, preferably 0.2-0.5 mol per mol $Sb_2O_5$ in the hydrosol. Smaller than 0.01 mol $SiO_2$ would result in unstable organo-antimony oxide sol, while larger than 0.8 mol $SiO_2$ would lead to deteriorated electrical conductivity of the colloidal antimony oxide particles.

Examples of the organic solvent used in Procedure (ii) above include alcohols such as methanol, ethanol, isopropanol and n-butanol and water-soluble or water-miscible organic solvents such as methylcellosolve, ethylcellosolve and acetone. These organic solvents boiling below 100° C. are preferred for easy exchange with photo-setting monomers.

The organo-silicon compound and the organic solvent may be added simultaneously to the antimony oxide hydrosol, but preferably the addition of the organic solvent precedes, in which instance it is adjusted in an amount such that the concentration of $Sb_2O_5$ become 3-20 percent by weight in the sol, or alternatively both are mixed beforehand and then later added to the hydrosol.

(iii) Replacement of water with organic solvent The sol pretreated as in Procedure (ii) is condensed for example by evaporation, ultrafiltration or other known means, followed by dilution with a water soluble or water-miscible organic solvent. The admixture is further condensed until the water in the sol is reduced to below 3 wt. %, with $Sb_2O_5$ concentrations in the sol adjusted in the range of 20-40 wt. %.

(iv) Surface-reforming of particulate colloidal antimony oxide

The organo-antimony oxide sol obtained in Procedure (iii) above is combined with an organo-silicon compound of Formula (1) and heated with stirring to 40°-90° C. for 0.5-5 hours thereby providing surface-reformed particulate antimony oxide.

Examples of the organo-silicon compound of Formula (1) include γ-methacryloxypropyl trimethoxy silane, γ-methacryloxypropyl triethoxy silane, γ-methacryloxypropyl methyldimethoxy silane, tris-(β-methacryloxyethyl) propoxy silane, and γ-acryloxypropyl triethoxy silane.

The organo-silicon compound of Formula (1) is added on the basis of $SiO_2$ in an amount of 0.004–0.12 mol, preferably 0.03–0.08 mol per mol $Sb_2O_5$ in the sol. Less than 0.004 mol $SiO_2$ would induce gelation of the sol when admixed with the photo-setting monomer, whilst more than 0.12 mol $SiO_2$ would lead to deteriorated film-forming or photo-setting properties of the resulting sol.

Other organic solvents difficult to dissolve in water than specified above may be used in Procedure (ii) on condition that they are compatible with and used together with the specified water-soluble or water-miscible organic solvents. The same applies to the organic solvents used in Procedure (iii) and may be advantageously relied upon for some intended applications.

The organo-antimony oxide sol obtained in accordance with the invention may be used in a manner and for a purpose similar to the conventional counterpart; for instance, it may be used for a variety of coatings in which instance the sol having its particulate antimony oxide surface-reformed is held immune to gelation which would otherwise occur due to the presence of predominant monomers or oligomers in the coating composition.

Generally, for forming a film of a coating composition containing an organosol, it is the usual practice to remove the organic solvent with heat. Therefore, for such a substrate to be coated which is heat-phobic, the coating composition should preferably be free of any organic solvent.

Advantageously, the majority of the dispersant in the inventive organo-antimony oxide sol can be readily replaced to a photo-setting monomer in the manner described in Procedure (iii). The same procedure can be applied to the organo-antimony oxide sol obtained in Procedure (iv), in which the sol upon concentration is diluted and repeatedly condensed as by means of evaporation or ultrafiltration until the organic solvent in the sol is reduced to less than 20 weight %, preferably less than 10 weight % with $Sb_2O_5$ concentrations held in the range of 10-70 wt. %. The particle size of the antimony oxide dispersed in the resultant organosol is preferably in the range of 5-100 nm, more preferably 10-50 nm.

Eligible for the dispersant replacement under contemplation is a photo-setting monomer or oligomer, typical examples of which include allylacrylate, benszylacrylate, butoxyethylacrylate, butylacrylate, cyclohexylacrylate, epoxyacrylate, ethyldiethyleneglycol acrylate, glycerolmethacrylate, 1,6-hexanediol diacrylate, 2-hydroxyethylacrylate, 2-hydroxypropylacrylate, 2-hydroxypropylmethacrylate, isodecylacrylate, laurylacrylate, 2-methoxyethylacrylate, polybutadiene acrylate, polyethyleneglycol diacrylate, stearylacrylate, tetrahydrofurfuryl acrylate, urethane acrylate and mixtures thereof. Other eligible monomers are disclosed at pages 70-83 of the "Printing Handbook" published on Dec. 10, 1983 by the Sogo Gijitsu Shuppan Co.

As stated above, the organo-antimony oxide sol according to the invention can retain the particulate antimony oxide intact with its conductive properties and hence can be successfully blended with a suitable photo-setting resin composition for coating a substrate which requires electric conductivity.

The term photo-setting resin composition as used herein designates a composition containing such monomers or oligomers which initiate polymerization on contact with ultraviolet rays, electron rays, X-rays or like optical energies. With relatively low energy rays such as ultraviolet rays, there may be used some suitable photo-polymerization initiators. Such initiators useful for the purpose of the invention include isopropylthioxanetone, benzophenone, 2-ethylanthraquinone, isobutylthioxanetone and other dehydrogenation type photo-polymerization initiators.

The amount of the organo-antimony oxide sol to be blended with the photo-setting resin composition ranges from 10 to 60 weight %, preferably from 20 to 50 weight % in terms of $Sb_2O_5$.

The coating composition of the invention may be suitably applied to a substrate of polycarbonate, acrylate and other plastics material in film or sheet form, rendering the substrate antistatic. Because of its high transparency and good electrical conductivity, the inventive coating composition has a particularly effective application as a coating for the radiation and/or recording surface of an optical disc. Other useful applications include coating spectacles, window panes, curtains, automobile windshields, packing materials, furnitures, musical instruments and the like where antistatic protection is required. Also to be noted is the usefulness of the organo-antimony oxide per se as a flame-retarding agent.

INVENTIVE EXAMPLE 1

To 1,800 grams of deionized water having dissolved therein 57 grams of caustic potash (85 wt. % purity, produced by Asahi Glass Co.) were added 111 grams of antimony trioxide (99 wt. % purity, ATOX-R of Nippon Seiko Co.). The resulting suspension was heated to 100° C., followed by addition of a solution of 220 grams of deionized water diluted with 58.4 grams of hydrogen peroxide (35 wt, % purity produced by Hayashi Junyaku Co.) over a period of 14 hours (at a rate of 0.6 mol/hr.) thereby dissolving the antimony trioxide. 1,000 grams of the solution after being cooled were sampled and diluted with 1,500 grams of deionized water, followed by passing through a cationic exchange resin (pK-216 of Mitsubishi Kasei Co.). The thus deionized solution was heated at 100° C. for 10 hours and subjected to ultrafiltration thereby providing a 19 wt. % antimony oxide sol. 100 particles of the oxide were measured under electron microscope to give an average colloidal particle size of 15 nm. A portion of the sol was dried and analyzed by X-ray diffraction to reveal the presence of a pyrochlore structure.

2,000 grams of the sol. were taken into a 5-liter separable flask equipped with stirrer and condenser, followed by addition of a mixture of 84.4 grams of tetraethoxysilane and 2,000 grams of methylalcohol. The admixture was allowed to react at 50° C. for 60 minutes, cooled and thereafter ultrafiltrated to 20 wt. % in terms of $Sb_2O_5$. Methylalcohol was added to replace the water through ultrafiltration to provide a sol having $Sb_2O_5$ concentration of 30 wt. % and water of 0.8 wt. % dispersed in the organic solvent. 100 grams of the sol were combined with 3.6 grams of γ-methacryloxy-propyltrimethoxy silane (KBM-503 of Shinetsu Chemicals Co.) and allowed to react at 80° C. for five minutes. The admixture was cooled, followed by addition of 20 grams of 2-hydroxyethyl acrylate (HEA) and distillation in vacuum in a 40° C. water bath thereby producing an antimony sol containing 46 wt. % of $Sb_2O_5$. The resulting antimony oxide sol is identified in Table 1.

INVENTION EXAMPLE 2

The procedure of Inventive Example 1 was followed except that γ-methacryloxypropyltriethoxy silane was used in place of γ-methacryloxypropyltrimethoxy silane.

INVENTIVE EXAMPLE 3

The procedure of Inventive Example 1 was followed with the exception that 2-hydroxybutyl acrylate (HBA) was used in place of 2-hydroxyethyl arcylate.

INVENTIVE EXAMPLE 4

The procedure of Inventive Example 1 was followed except that 76 grams of vinyltriethoxy silane were used in place of 84.4 grams of tetraethoxy silane.

INVENTIVE EXAMPLE 5

The procedure of Inventive Example 1 was followed except that 18 grams of tetraethoxy silane were used in place of 84.4 grams of tetraethoxy silane.

INVENTIVE EXAMPLE 6

In a manner similar to Inventive Example 1, to 1,000 grams of 5 wt. % $Sb_2O_5$ solution with antimony trioxide dissolved therein were added 100 grams of 5 wt. % ($S_nO2$) solution of potassium stannate. The admixture was diluted with 1,500 grams of deionized water and thereafter passed through a cation-exchange resin, thereby providing an antimony complex oxide sol. The resulting sol was analyzed to reveal a pyrochlore structure.

INVENTIVE EXAMPLE 7

The procedure of Inventive Example 6 was followed except that 50 grams of 5 wt. % (WO3) ammonium tungstate were used in place of 100 grams of potassium stannate.

INVENTIVE EXAMPLE 8

The procedure of Inventive Example 6 was followed except that 50 grams of 5 wt. % ($ZrO_2$) zirconyl carbonate ammonium were used in place of 100 grams potassium stannate and that 2-hydroxypropyl acrylate was used as a monomer in place of HEA.

INVENTIVE EXAMPLE 9

In a manner similar to Inventive Example 1, there was prepared an admixture of deionized solution of antimony oxide and 25 grams of 1 % ($TiO_2$) titanium chloride solution was heated at 100° C. for 10 hours, passed through an anion-exchange resin to remove the chlorine and ultrafiltrated to provide 19% complex sol of antimony oxide and titanium oxide.

INVENTIVE EXAMPLE 10

The deionized solution of antimony oxide obtained as in Inventive Example 1 was added with 100 grams of 5 wt. % ($P_2O_5$) phosphoric acid. The admixture was treated in a manner similar to Inventive Example 9 to provide an antimony oxide sol. HPA was used in place of HEA.

INVENTIVE EXAMPLE 11

The deionized antimony oxide solution prepared as in Inventive Example 1 was added with 100 grams of 5 wt. % ($B_2O_3$) boric acid solution and treated as in Inventive Example 9 to provide an antimony oxide sol.

COMPARATIVE EXAMPLE 1

2,000 grams of antimony oxide sol with the same dispersant as used in Inventive Example 1 were taken into a separable flask equipped with stirrer and condenser, followed by addition of an admixture of 84.4 grams of tetraethoxy silane and 2,000 grams of methylalcohol. The whole was allowed to react at 50° C. for 60 minutes, thereafter cooled and ultrafiltrated to a concentration of 20 wt. % $Sb_2O_5$. Methylalcohol was added and replaced with water by ultrafiltration, thereby obtaining 30 wt. % ($Sb_2O_5$) antimony oxide sol. To 100 grams of the resulting sol were added 20 grams of 2-hydroxyethyl acrylate (HEA); The admixture was subjected to vacuum distillation in a 40° C. water bath, whereupon it grew into gel.

COMPARATIVE EXAMPLE 2

2,000 grams of antimony oxide sol with the same dispersant as used in Inventive example 1 were taken into a separable flask equipped with stirrer and condenser, followed by addition of an admixture of 250 grams of tetraethoxy silane and 2,000 grams of methylalcohol. The whole was allowed to react at 50° C. for 60 minutes, thereafter cooled and ultrafiltrated to concentrations of 20 wt. % $Sb_2O_5$. Methylalcohol was added and replaced with water by ultrafiltration, thereby obtaining 30 wt. % ($Sb_2O_5$) antimony oxide sol. To 100 grams of the resulting sol were added 20 grams of 2-hydroxyethyl acrylate (HEA). The admixture was subjected to vacuum distillation in a 40° C. water bath, whereupon there was obtained a monomer-dispersed antimony oxide sol of 50 wt. % $Sb_2O_5$ concentrations.

INVENTIVE EXAMPLE 12

The antimony oxide sols obtained in Inventive Examples 1–11 and Comparative Example 2 were used in the preparation of their respective coating compositions wherein 58.3 grams of each sol were admixed with 20 grams of urethane-based ultraviolet rays setting resin (DH700 of Daihachi Chemicals Co.). The thus prepared coating composition were each applied by a spinner at 2,000 rpm to a polycarbonate substrate and cured by exposure to ultraviolet rays from a high-pressure mercury lamp. The resulting coated films were tested for their respective surface resistivity with the results shown in Table 1.

TABLE 1

| | organo-antimony oxide sol | | | oxide in coating | surface resistivity |
|---|---|---|---|---|---|
| | colloidal particles | dispersant | oxide concentration wt % | composition wt % | of coated film $\Omega/\square$*1 |
| Inventive Example | | | | | |
| 1 | $Sb_2O_5$ | HEA | 46 | 34.2 | $1 \times 10^{12}$ |
| 2 | $Sb_2O_5$ | HEA | 50 | 37.2 | $1 \times 10^{11}$ |
| 3 | $Sb_2O_5$ | HEA | 30 | 22.3 | $2 \times 10^{12}$ |
| 4 | $Sb_2O_5$ | HEA | 45 | 33.5 | $1 \times 10^{12}$ |
| 5 | $Sb_2O_5$ | HEA | 45 | 33.5 | $2 \times 10^{12}$ |
| 6 | $SnO_2$—$Sb_2O_5$ | HEA | 45 | 33.5 | $5 \times 10^{11}$ |
| 7 | $WO_3$—$Sb_2O_5$ | HEA | 45 | 33.5 | $7 \times 10^{11}$ |
| 8 | $ZrO_2$—$Sb_2O_5$ | HPA | 40 | 29.8 | $2 \times 10^{12}$ |
| 9 | $TiO_2$—$Sb_2O_5$ | HEA | 45 | 33.5 | $9 \times 10^{10}$ |
| 10 | $P_2O_5$—$Sb_2O_5$ | HPA | 40 | 29.8 | $3 \times 10^{12}$ |
| 11 | $B_2O_3$—$Sb_2O_5$ | HEA | 45 | 33.5 | $2 \times 10^{11}$ |
| Comparative Example | | | | | |
| 1 | $Sb_2O_5$ | HEA | gelled | — | |
| 2 | $Sb_2O_5$ | HEA | 50 | 37.2 | $1 \times 10^{16}$ |

*1tested by Hiresta (Mitsubishi Chemicals Company)

INVENTIVE EXAMPLE 13

58.3 grams of the monomer-dispersed antimony oxide sol obtained in Inventive Example 1 was admixed with 20 grams of urethane-based ultraviolet-ray setting resin (DH-700 of Daihachi Chemicals Co.), and a coating composition was prepared as per Inventive Example 11. The coating was applied by spin-coating at 2,500 rpm×5 seconds to a polycarbonate optical disc substrate and immediately thereafter cured by a high-pressure mercury lamp (ultraviolet rays) to form an electrically conductive film as identified in Table 2.

INVENTIVE EXAMPLE 14

The procedure of Inventive Example 13 was followed in the preparation of an electrically conductive coating composition except that the monomer-dispersed antimony oxide sol of Inventive Example 3 and an optical disc substrate of acrylic resin were used. The resulting coated substrate had the properties shown in Table 2.

TABLE 2

| | film thickness (μm) | surface resistivity ($\Omega/\square$)*1 | total light permeability (%)*2 | penicle hardness*3 |
|---|---|---|---|---|
| Inventive Example 13 | 3 | $1 \times 10^{12}$ | 90 | H |
| Inventive Example 14 | 3 | $2 \times 10^{12}$ | 90 | H |

*1Hiresta (Mtsubishi Chemicals Company)
*2Haze computer (Suga Tester Co.)
*3Pursuant to JIS-K-5400

Beneficiary Effects of the Invention

The organo-antimony oxide sols, particularly those of a photo-setting resin monomer dispersion, provided by the invention can be blended directly with a photo-setting resin composition without use of any solvent to produce a coating composition which is rendered electrically conductive.

Conventional antimony oxide sols using organic solvents as the dispersant and blended with a photo-setting resin composition would require added equipment and facilities such as for heating, ventilation, explosion-proofing and the like that are necessary to achieve the evaporation of the organic solvent when curing the coating. Such coatings were infeasible for application to heat-phobic substrates. All of these difficulties encounted with the prior art can be eliminated or alleviated by the teachings of the present invention.

What is claimed is:

1. An organo-antimony oxide sol comprising an organic dispersant and a particulate colloidal antimony oxide having a pyrochlore structure, said particulate colloidal antimony oxide having electrical conductivity and being formed by a process comprising the steps (a) treating a particulate colloidal organo-antimony oxide sol with an organosilicon compound of formula (2)

$$R_n\text{—Si—}(OR^1)_m \quad (2)$$

wherein R is $C_1$–$C_6$ hydrocarbon; $R^1$ is $C_1$–$C_6$ alkyl; n is an integer of 0 to 3; and m is an integer of 4–n, wherein one mole of particulate colloidal organo-antimony oxide sol based on $Sb_2O_5$ is treated with 0.01 to 0.8 mole of organosilicon compound of formula (2); and (b) treating a particulate colloidal organo-antimony oxide prepared by a process comprising step (a) with an organosilicon compound of formula (1) to achieve surface-reforming of a particulate organo-antimony oxide, wherein formula (1) is

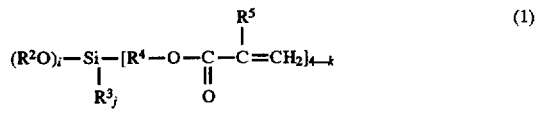

$$(R^2O)_i\text{—Si—}[R^4\text{—O—}\underset{\underset{O}{\|}}{C}\text{—C=CH}_2]_{4-k} \quad (1)$$
$$\underset{R^3_j}{|}$$

and $R^2$ is hydrogen or a $C_1$–$C_5$ alkyl group; $R^3$ is hydrogen or a $C_1$–$C_5$ alkyl group; $R^4$ is a $C_1$–$C_8$ alkylene group; $R^5$ is hydrogen or a $C_1$–$C_8$ alkyl group; i is an integer of 1–3; j is an integer of 0–2; and k is an integer of 1–3 equal to i+j, wherein one mole of said particulate organo-antimony oxide based on $Sb_2O_5$ is treated with 0.004 mol to 0.12 mol organosilicon compound of formula (1); and said organic dispersant comprises less than 20 wt % of an organic solvent and a photo-setting monomer or oligomer.

2. The organo-antimony oxide sol according to claim 1 wherein the particle size of the particulate colloidal antimony oxide is in the range of 5 nm to 100 nm.

3. The organo-antimony oxide sol according to claim 1 wherein the particle size of the particulate colloidal antimony oxide is in the range of 10 nm to 50 nm.

4. The organo-antimony oxide sol according to claim 1 wherein the particulate colloidal antimony oxide is present in a concentration of 10 wt % to 70 wt %.

5. The organo-antimony oxide sol according to claim 1 wherein said organic dispersant comprises a photo-setting monomer or oligomer.

6. The organo-antimony oxide sol according to claim 5 wherein the photo-setting monomer or oligomer is selected from the group consisting of allylacrylate, benzylacrylate, butoxyethylacrylate, butylacrylate, cyclohexylacrylate, epoxyacrylate, ethyldiethyleneglycol acrylate, glycerolmethacrylate, 1,6-hexanediol diacrylate, 2-hydroxyethylacrylate, 2-hydroxypropylacrylate, 2-hydroxypropylmethacrylate, isodecylacrylate, laurylacrylate, 2-methoxyethylacrylate, polybutadiene acrylate, polyethyleneglycol diacrylate, stearylacrylate, tetrahydrofurfuryl acrylate, urethane acrylate and mixtures thereof.

7. The organo-antimony oxide sol according to claim 1 wherein R from formula (2) is selected from the group consisting of alkyl, vinyl, allyl and acetyl containing groups.

8. The organo-antimony oxide sol according to claim 1 wherein the organosilicon compound of formula (2) is an alkoxysilane selected from the group consisting of tetramethoxysilane, methyltrimethoxysilane, dimethyldimethoxysilane, methyltrimethoxysilane, methyltriisopropylsilane and phenyltriethoxysilane.

9. The organo-antimony oxide sol according to claim 1 wherein the organosilicon compound of Formula (2) is a vinylsilane.

10. The organo-antimony oxide sol according to claim 9 wherein the vinylsilane is vinyltriethoxysilane.

11. The organo-antimony oxide sol according to claim 1 wherein step (a) is conducted in the presence of an organic solvent having a boiling point below 100° C.

12. The organo-antimony oxide sol according to claim 11 wherein the organic solvent is selected from the group consisting of methanol, ethanol, iso-propanol, n-butanol, methylcellosolve, ethylcellosolve and acetone.

13. The organo-antimony oxide sol according to claim 11 wherein the concentration of $Sb_2O_5$ is 3 to 20 percent in the solvent.

14. The organo-antimony oxide sol according to claim 1 wherein said organic dispersant comprises less than 10 wt % of an organic solvent and a photo-setting monomer or oligomer.

15. The organo-antimony oxide sol according to claim 1 wherein step (b) comprises heating the particulate organo-antimony oxide prepared by a process comprising step (a) with stirring to 40° C. to 90° C. for 0.5 to 5 hours in the presence of the organosilicon compound of formula (1).

16. The organo-antimony oxide sol according to claim 1 wherein the organosilicon compound of formula (1) is selected from the group consisting of γ-methacryloxypropyl trimethoxy silane, γ-methacryloxypropyl triethoxy silane, γ-methacryloxypropyl methyldimethoxy silane, tris-(β-methacryloxyethyl) propoxysilane and γ-acryloxypropyl triethoxy silane.

17. The organo-antimony oxide sol according to claim 1 wherein one mole of particulate organo-antimony oxide based on $Sb_2O_5$ is treated with 0.03 to 0.08 mol of organosilicon compound of formula (1).

18. The organo-antimony oxide sol according to claim 1 doped with an element selected from the group consisting of silicon, zinc, tin, indium, phosphorus, boron, titanium, zirconium, hafnium, cerium, iron, tellurium and tungsten.

19. A coating composition comprising the organic-antimony oxide sol according to claim 1.

20. The coating composition according to claim 19 where said composition cures upon exposure to actinic radiation.

21. The coating composition according to claim 19 that is electrically conductive.

22. The coating composition according to claim 19 further comprising a photo-setting resin composition.

23. The coating composition according to claim 22 where the photo-setting resin composition comprises monomer and oligomers which polymerize on contact with radiation selected from the group consisting of ultraviolet rays, electron rays and x-rays.

24. The coating composition according to claim 22, further comprising a photo-polymerization initiator selected from the group consisting of isopropylthioxanethone, benzophenone, 2-ethylanthraquinone and isobutylthioxanetone.

25. The coating composition according to claim 19 wherein the amount of the organo-antimony oxide sol blended with the photo-setting resin composition ranges from 10 wt % to 60 wt % based on the weight of $Sb_2O_5$.

26. The coating composition according to claim 19 wherein the amount of the organo-antimony oxide sol blended with the photo-setting resin composition ranges from 20 wt % to 50 wt % based on the weight of $Sb_2O_5$.

27. The coating composition according to claim 19 which is essentially free of organic solvent having a boiling point of less than about 100° C.

* * * * *